US011991503B2

(12) United States Patent
Braband et al.

(10) Patent No.: US 11,991,503 B2
(45) Date of Patent: May 21, 2024

(54) HEARING ASSISTANCE DEVICE WITH MULTIPURPOSE MICROPHONE

(71) Applicant: Starkey Laboratories, Inc., Eden Prairie, MN (US)

(72) Inventors: Joshua Elliot Braband, Eden Prairie, MN (US); Sidney A. Higgins, Maple Grove, MN (US); David Tourtelotte, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 17/756,220

(22) PCT Filed: Nov. 20, 2020

(86) PCT No.: PCT/US2020/070808
§ 371 (c)(1),
(2) Date: May 19, 2022

(87) PCT Pub. No.: WO2021/102469
PCT Pub. Date: May 27, 2021

(65) Prior Publication Data

US 2022/0417683 A1 Dec. 29, 2022

Related U.S. Application Data

(60) Provisional application No. 62/937,950, filed on Nov. 20, 2019.

(51) Int. Cl.
*H04R 25/00* (2006.01)

(52) U.S. Cl.
CPC ........... *H04R 25/609* (2019.05); *H04R 25/48* (2013.01); *H04R 25/65* (2013.01); *H04R 2225/57* (2019.05); *H04R 2225/61* (2013.01)

(58) Field of Classification Search
CPC .............................. H04R 25/60; H04R 1/1016
(Continued)

(56) References Cited

U.S. PATENT DOCUMENTS 3,798,390 A 3/1974 Gage et al.
2020/0213731 A1* 7/2020 Miller ................. G10L 21/0232

FOREIGN PATENT DOCUMENTS

EP 2835987 A1 2/2015
WO WO-2021102469 A1 5/2021

OTHER PUBLICATIONS

"International Application Serial No. PCT/US2020/070808, International Search Report dated Feb. 19, 2021", 4 pgs.
(Continued)

*Primary Examiner* — George C Monikang
(74) *Attorney, Agent, or Firm* — Schwegman Lundberg & Woessner, P.A.

(57) ABSTRACT

Disclosed herein, among other things, are apparatus and methods for a multipurpose microphone for hearing devices. A hearing assistance device includes a first housing configured to be worn above an ear of a wearer and a second housing configured to be worn in the ear of the wearer. The device also includes a cable configured to connect to the first housing at a first end and to the second housing at the second end, and a microphone at the second end of the cable, the microphone including an input port facing an acoustic channel. A switch is provided in the acoustic channel, the switch having a first position such that acoustic input to the microphone is received from an inner portion of the ear of the wearer, and a second position such that acoustic input to the microphone is received from an area outside the ear of the wearer.

20 Claims, 5 Drawing Sheets

(58) Field of Classification Search
USPC .......................................... 381/322, 324, 328
See application file for complete search history.

(56) References Cited

OTHER PUBLICATIONS

"International Application Serial No. PCT/US2020/070808, Written Opinion dated Feb. 19, 2021", 7 pgs.

* cited by examiner

HEARING ASSISTANCE DEVICE WITH MULTIPURPOSE MICROPHONE

CLAIM OF PRIORITY

This patent application is a U.S. National Stage Filing under U.S.C. 371 from International Application No. PCT/US2020/070808, filed on Nov. 20, 2020, and published as WO 2021/102469, which claims the benefit of priority to U.S. Provisional Application Ser. No. 62/937,950, filed Nov. 20, 2019, each of which are incorporated by reference herein in their entirety.

TECHNICAL FIELD

This document relates generally to hearing assistance systems and more particularly to a multipurpose microphone for hearing assistance device applications.

BACKGROUND

Hearing assistance devices, such as hearing aids, are used to assist patients suffering hearing loss by transmitting amplified sounds to ear canals. In one example, a hearing aid is worn in and/or around a patient's ear. Hearing aids may provide adjustable operational modes or characteristics that improve the performance of the hearing aid for a specific person or in a specific environment. Some of the operational characteristics are volume control, tone control, and selective signal input. These and other operational characteristics may be programmed into a hearing aid. A programmable hearing aid may be programmed through connections to the hearing aid and by wirelessly communicating with the hearing aid. Generally, hearing aids are small and require extensive design to fit all the necessary electronic components into the hearing aid or attached to the hearing aid.

There is a need in the art for an improved microphone system for hearing assistance device applications.

SUMMARY

Disclosed herein, among other things, are apparatus and methods for a hearing assistance device with a multipurpose microphone. In various embodiments, a hearing assistance device includes a first housing configured to be worn above an ear of a wearer, the first housing including hearing assistance electronics, and a second housing configured to be worn in the ear of the wearer, the second housing including a receiver configured to output signals processed by the hearing assistance electronics. The device also includes a cable configured to connect to the first housing at a first end and to the second housing at the second end, and a microphone at the second end of the cable, the microphone including an input port facing an acoustic channel. The device further includes a switch in the acoustic channel, the switch having a first position in which the acoustic channel is open towards an inner portion of the ear of the wearer such that acoustic input to the microphone is received from the inner portion of the ear of the wearer, and a second position in which the acoustic channel is open away from the inner portion of the ear of the wearer such that acoustic input to the microphone is received from an area outside the ear of the wearer.

Various aspects of the present subject matter include a method including processing sound received through a first acoustic path of a microphone using a processor of a hearing assistance device, wherein the microphone is in a receiver housing configured to be placed in or near an ear of a wearer of the hearing assistance device. The method may also include actuating a switch in the receiver housing to shift from the first acoustic path to a second acoustic path of the microphone, and processing sound received through the second acoustic path using the processor of the hearing assistance device.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing assistance devices using the example of hearing aids. Other hearing assistance devices include, but are not limited to, those in this document. It is understood that their use in the description is intended to demonstrate the present subject matter, but not in a limited or exclusive or exhaustive sense.

One example of a hearing assistance device is a receiver-in-the-canal (RIC) hearing aid. There is currently a need for having a microphone on the receiver end of the RIC cable inside the ear. There are two ways such a microphone could be positioned. In a first position, the inlet of the microphone facing in towards the ear into the same volume of the direction of the receiver output. In this first position, the microphone can be used to sense the voice of the wearer (own-voice sensing), in an embodiment. The second position is facing out of the ear into the ambient environment. In the second position, the microphone can be used to sense sounds from the wearer's environment, in combination with or independently from a microphone in the above-the-ear portion of the hearing device. Traditionally, to achieve both options, two microphones would be needed. The present subject matter provides for using one microphone and a switch, vent or valve that can change the input of the acoustic port of the microphone. The switch, vent or valve can be electrically actuated using electronics of the hearing assistance device, manually actuated by a wearer using a button or switch, or actuated wirelessly from a remote control or mobile application, in various embodiments. The switch, vent or valve can also be used to provide a fully occluded or fully open configuration, according to various embodiments. By using a single microphone, the present subject matter uses less space on the in-the-ear portion of the device, frees up data lines in the cable, reduces cost of the device, and reduces power consumption thus extending battery life.

Figure 1A:
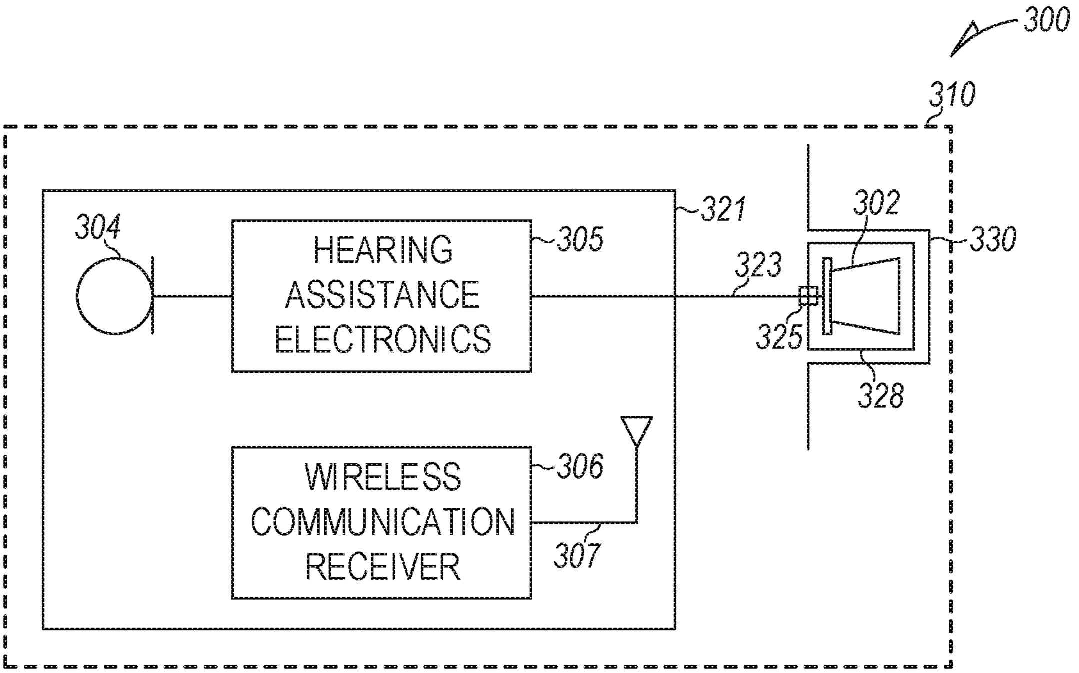
FIG. 1A illustrates a block diagram of a system for including a hearing assistance device, according to various embodiments of the present subject matter.

FIG. 1A illustrates a block diagram of a system 300 including a hearing assistance device 310, according to various embodiments of the present subject matter. In various embodiments, the hearing assistance device 310 includes a first housing 321, an acoustic receiver or speaker 302 in a second housing 328 positioned in or about the ear canal 330 of a wearer, and a cable 323 including conductors coupling the receiver 302 to the first housing 321 and the electronics enclosed therein. According to various embodiments, the electronics enclosed in the first housing 321 include a microphone 304, hearing assistance electronics 305, a wireless communication receiver 306 and an antenna 307. In various embodiments, the hearing assistance electronics 305 includes at least one processor and memory components. The memory components store program instructions for the at least one processor. The program instructions include functions allowing the processor and other components to process audio received by the microphone 304 and transmit processed audio signals to the speaker 302.

The speaker 302 emits the processed audio signal as sound in the user's ear canal. In various embodiments, the hearing assistance electronics 305 includes functionality to amplify, filter, limit, condition or a combination thereof, the sounds received using the microphone 304. In the illustrated embodiment of FIG. 1A, the system includes a multipurpose microphone 325 at a second end of the cable 323. In some embodiments, the multipurpose microphone 325 is included in the cable 323. In other embodiments, the multipurpose microphone is included in the second housing 328.

Figure 1B:
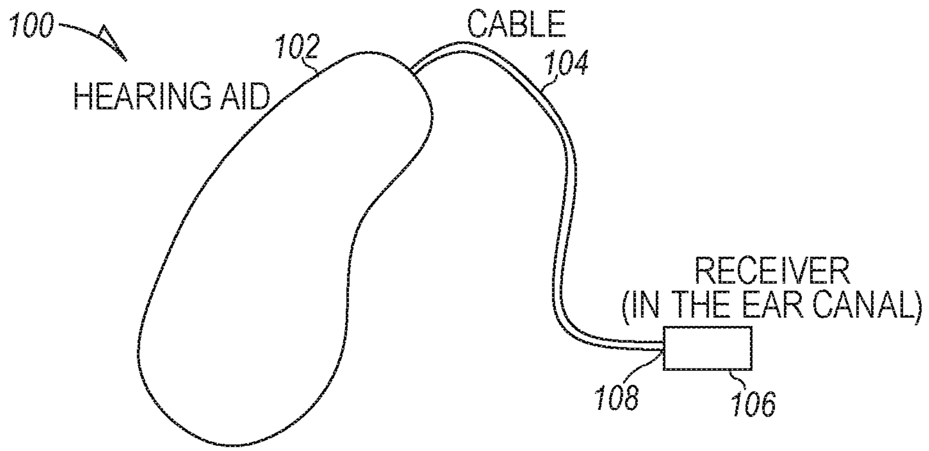
FIG. 1B illustrates a hearing assistance device including a multipurpose, according to various embodiments of the present subject matter.

FIG. 1B illustrates a hearing assistance device, such as hearing aid 100, including a multipurpose microphone 108, according to various embodiments of the present subject matter. The hearing aid 100 includes a first housing 102 configured to be worn above an ear of a wearer, the first housing including hearing assistance electronics, and a second housing 106 configured to be worn in the ear of the wearer, the second housing 106 including a receiver configured to output signals processed by the hearing assistance electronics. The hearing aid also includes a cable 104 configured to connect to the first housing 102 at a first end and to the second housing 106 at the second end, and the multipurpose microphone 108 at the second end of the cable.

Figure 2A:
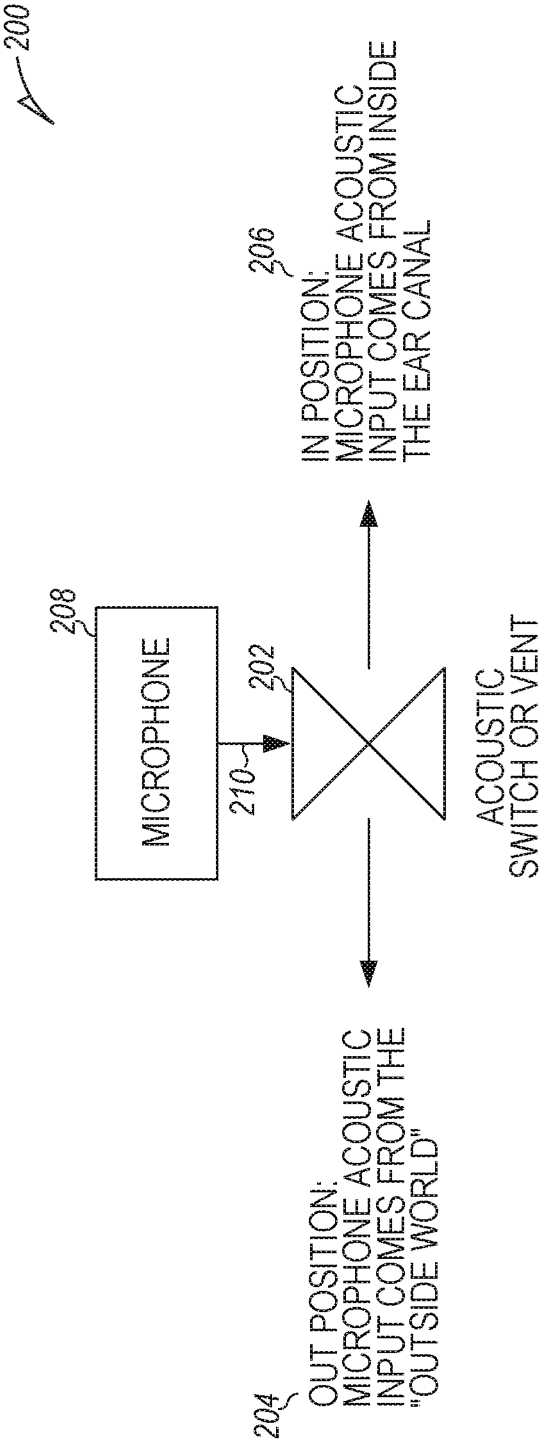
FIG. 2A illustrates a block diagram of a system including multipurpose microphone for a hearing assistance device, according to various embodiments of the present subject matter.

FIG. 2A illustrates a block diagram of a system including multipurpose microphone 208 for a hearing assistance device, such as hearing aid 100 in FIG. 1B, according to various embodiments of the present subject matter. In various embodiments, the microphone 208 includes an input port 210 facing an acoustic channel. The device further includes a switch or vent 202 in the acoustic channel, the switch or vent 202 having a first position 206 in which the acoustic channel is open towards an inner portion of the ear of the wearer such that acoustic input 210 to the microphone 208 is received from the inner portion of the ear of the wearer, and a second position 204 in which the acoustic channel is open away from the inner portion of the ear of the wearer such that acoustic input 210 to the microphone 208 is received from an area outside the ear of the wearer.

According to various embodiments, the microphone, the acoustic channel and the switch are included in the cable. In other embodiments, the microphone, the acoustic channel and the switch are included in the second housing.

In some embodiments, at least one of the microphone, the acoustic port and the switch are included in the cable, and at least one of the microphone, the acoustic port and the switch are included in the second housing. The switch includes an acoustic switch, in some embodiments. In various embodiments, the acoustic switch includes one or more of a sliding spool valve, a butterfly valve, a movable membrane valve, a ball valve, a gate valve, or a solenoid valve. In some embodiments, the switch includes an acoustic vent. The switch is configured to be mechanically actuated, in various embodiments. In some embodiments, the switch is configured to be electromechanically actuated. In various embodiments, the first housing includes a second microphone configured to receive an acoustic input for processing by the hearing assistance electronics. In some embodiments, the switch includes a third position in which the acoustic channel is open towards an inner portion of the ear of the wearer and open away from the inner portion of the ear of the wearer such that acoustic porting is open from the inner portion of the ear of the wearer to the area outside the ear of the wearer, and the acoustic input to the microphone is open to the acoustic channel. In various embodiments, the switch includes a fourth position in which the acoustic channel is open towards an inner portion of the ear of the wearer and open away from the inner portion of the ear of the wearer such that acoustic porting is open from the inner portion of the ear of the wearer to the area outside the ear of the wearer, and the acoustic input to the microphone is closed to the acoustic channel. The hearing assistance device is a receiver-in-the-canal (RIC) hearing aid, in various embodiments.

Figure 2B:
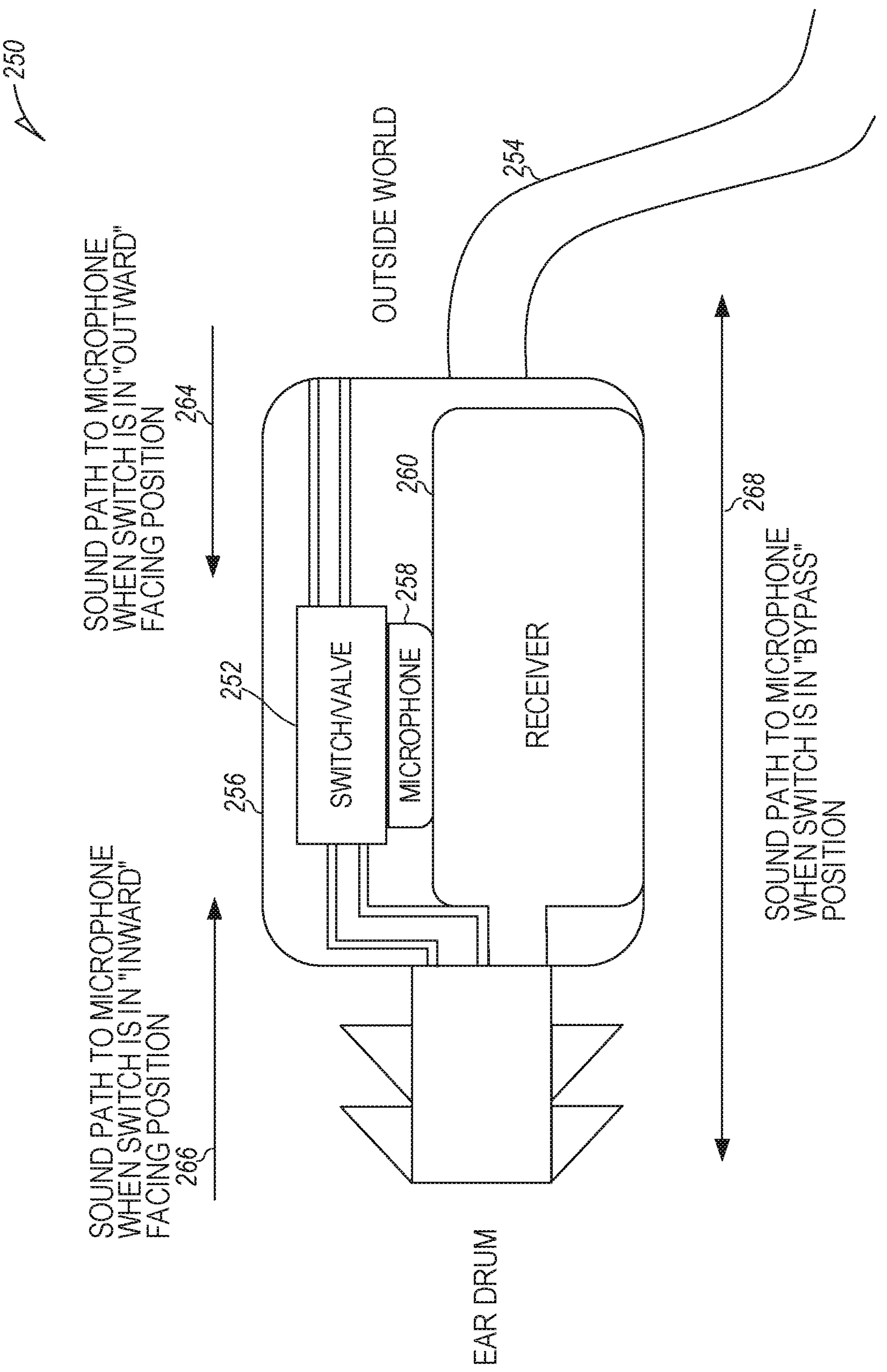
FIG. 2B illustrates a system including a multipurpose microphone for a hearing assistance device, according to various embodiments of the present subject matter.

FIG. 2B illustrates a system including a multipurpose microphone for a hearing assistance device, according to various embodiments of the present subject matter. The system 250 may include a cable 254 configured to be connected to a receiver housing 256 for placement in or near a wearer's ear canal. A multipurpose microphone 258, a receiver 260 and a switch or valve 252 reside within the housing. The switch or valve 252 has at least four positions, in various embodiments. When the switch or valve 252 is in a first position 266 an acoustic channel is open towards an inner portion of the ear of the wearer such that acoustic input to the microphone 258 is received from the inner portion of the ear of the wearer. When the switch or valve 252 is in a second position 264 an acoustic channel is open away from the inner portion of the ear of the wearer such that acoustic input to the microphone 258 is received from an area outside the ear of the wearer. When the switch or valve 252 is in a third position 268 an acoustic channel is open towards an inner portion of the ear of the wearer and open away from the inner portion of the ear of the wearer such that acoustic porting is open from the inner portion of the ear of the wearer to the area outside the ear of the wearer, and the acoustic input to the microphone 258 is open to the acoustic channel. When the switch or valve 252 is in a fourth position an acoustic channel is open towards an inner portion of the ear of the wearer and open away from the inner portion of the ear of the wearer such that acoustic porting is open from the inner portion of the ear of the wearer to the area outside the ear of the wearer, and the acoustic input to the microphone 258 is closed to the acoustic channel.

Figure 3A:
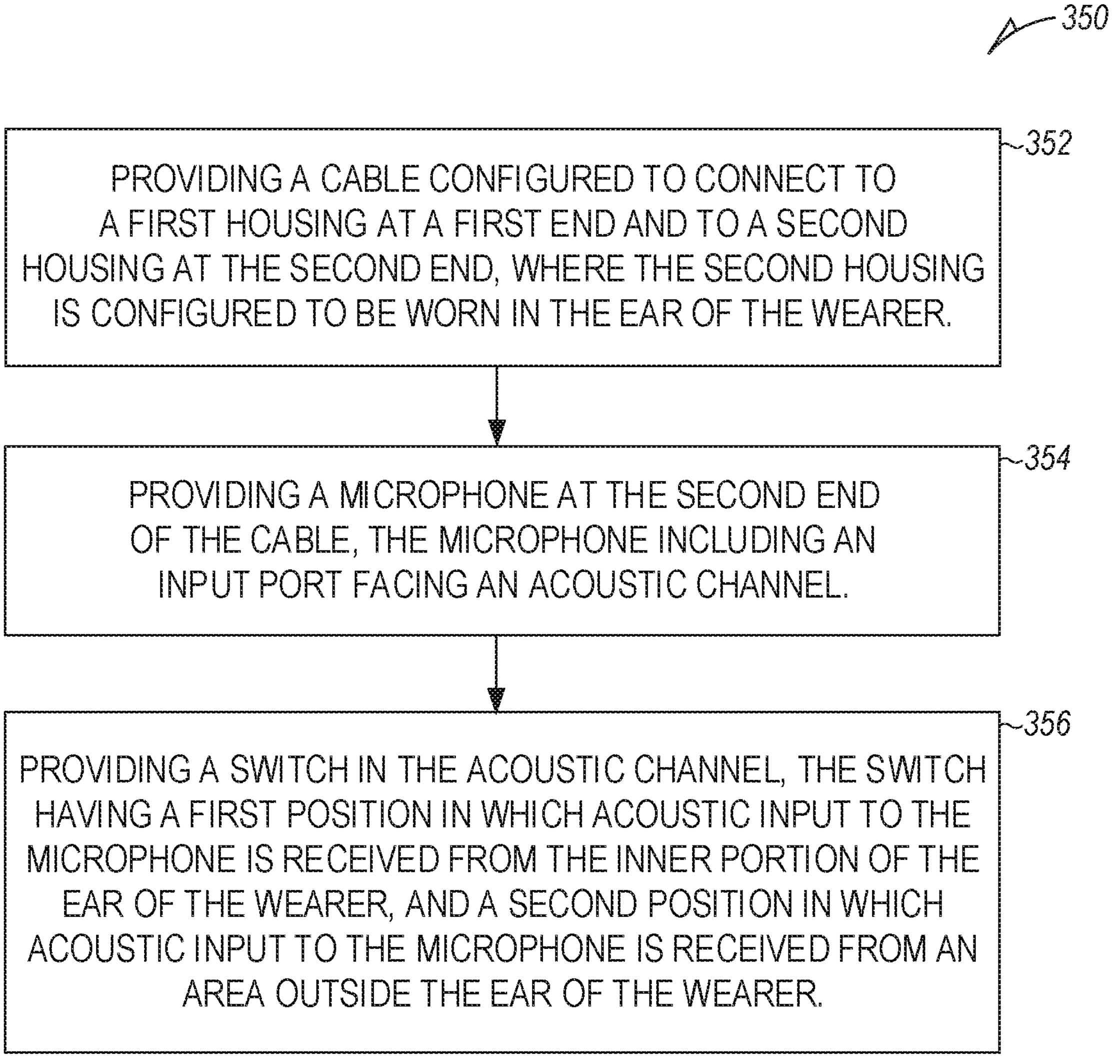
FIG. 3A illustrates a flow diagram of a method of forming a hearing assistance device, according to various embodiments of the present subject matter.

FIG. 3A illustrates a flow diagram of a method 350 of forming a hearing assistance device, according to various embodiments of the present subject matter. The method 350 includes providing a cable configured to connect to a first housing at a first end and to a second housing at the second end, wherein the first housing is configured to be worn above an ear of a wearer and the second housing configured to be worn in the ear of the wearer, at step 352, and providing a microphone at the second end of the cable, the microphone including an input port facing an acoustic channel, at step 354. At step 356, the method also includes providing a switch in the acoustic channel, the switch having a first position in which the acoustic channel is open towards an inner portion of the ear of the wearer and closed away from the inner portion of the ear of the wearer such that acoustic input to the microphone is received from the inner portion of the ear of the wearer, and a second position in which the acoustic channel is open away from the inner portion of the ear of the wearer and closed towards the inner portion of the ear of the wearer such that acoustic input to the microphone is received from an area outside the ear of the wearer.

According to various embodiments, the switch includes an acoustic switch. In various embodiments, the acoustic switch includes one or more of a sliding spool valve, a butterfly valve, a movable membrane valve, a ball valve, a gate valve, or a solenoid valve. According to various embodiments, the switch includes a third position in which the acoustic channel is open towards an inner portion of the ear of the wearer and open away from the inner portion of the ear of the wearer such that acoustic porting is open from the inner portion of the ear of the wearer to the area outside the ear of the wearer, and wherein acoustic input to the microphone is open to the acoustic channel. In various embodiments, the switch includes a fourth position in which the acoustic channel is open towards an inner portion of the ear of the wearer and open away from the inner portion of the ear of the wearer such that acoustic porting is open from the inner portion of the ear of the wearer to the area outside the ear of the wearer, and wherein acoustic input to the microphone is closed to the acoustic channel. The hearing assistance device is a behind-the-ear (BTE) hearing aid, in some embodiments. In some embodiments, the hearing assistance device is a receiver-in-the-canal (RIC) hearing aid.

In various embodiments, a ferromagnetic material is provided and configured to maintain a position of the switch without drawing power from a power supply of the hearing assistance device. In some embodiments, where the switch, such as a vent valve, is of an electro-magnetic design, one or more ferromagnetic features within or outside of the switch or valve can maintain the valve state, without any power requirements from the hearing assistance device electronics. Power from the hearing assistance device electronics is only used briefly to change the vent state, in various embodiments. The ferromagnetic material or feature may be positioned to maintain the vent state without drawing power from the hearing aid electronics. For hearing aids with a strained power budget and a limited battery capacity, it is beneficial that the vent only consume power when the vent state is changed.

Figure 3B:
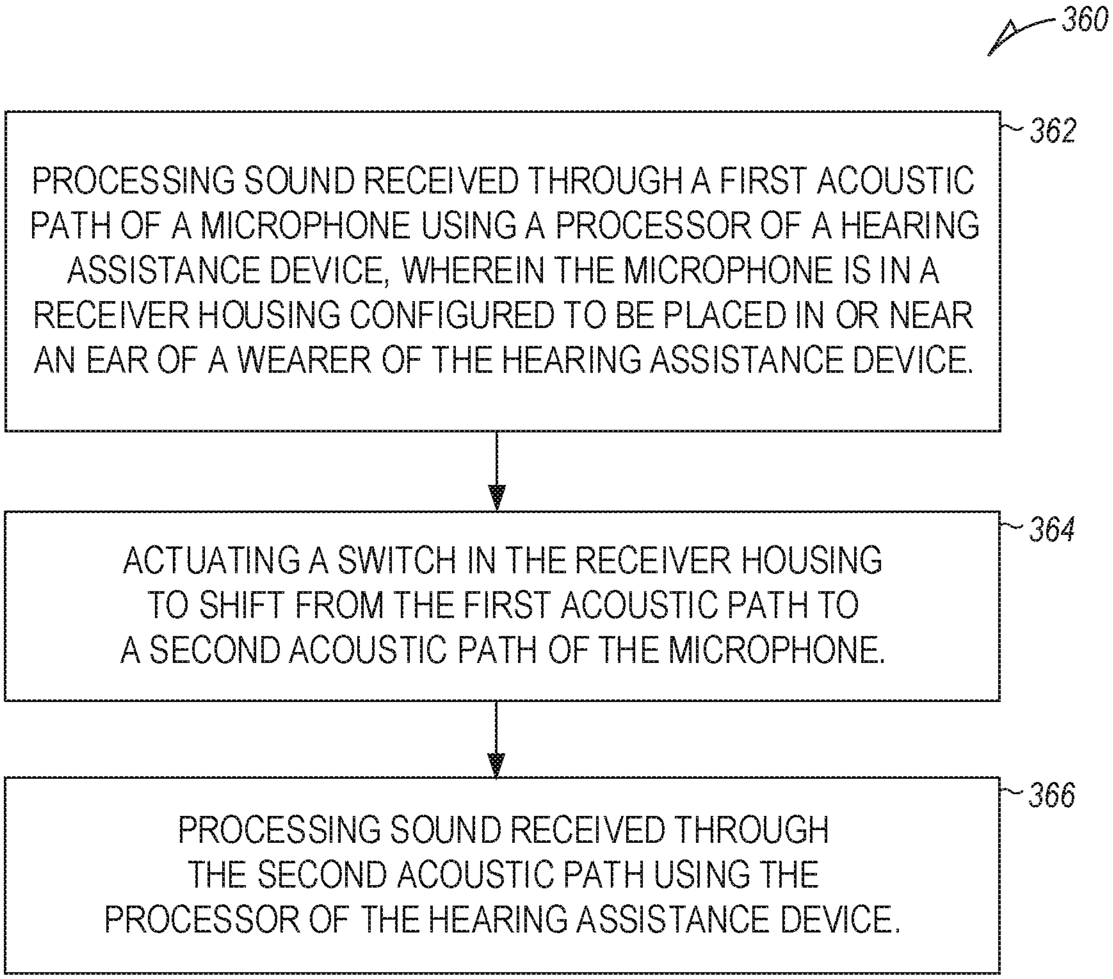
FIG. 3B illustrates a flow diagram of a method of using a hearing assistance device, according to various embodiments of the present subject matter.

FIG. 3B illustrates a flow diagram of a method of using a hearing assistance device, according to various embodiments of the present subject matter. The method 360 may include processing sound received through a first acoustic path of a microphone using a processor of a hearing assistance device, wherein the microphone is in a receiver housing configured to be placed in or near an ear of a wearer of the hearing assistance device, at step 362. At step 364, the method may include actuating a switch in the receiver housing to shift from the first acoustic path to a second acoustic path of the microphone. The method may further include processing sound received through the second acoustic path using the processor of the hearing assistance device, at step 366.

According to various embodiments, the first acoustic path is open towards an inner portion of the ear of the wearer and closed away from the inner portion of the ear of the wearer such that acoustic input to the microphone is received from the inner portion of the ear of the wearer. The second acoustic path is open away from an inner portion of the ear of the wearer and closed towards the inner portion of the ear of the wearer such that acoustic input to the microphone is received from an area outside the ear of the wearer, in various embodiments. According to various embodiments, the switch includes an acoustic switch, such as one or more of a sliding spool valve, a butterfly valve, a movable membrane valve, a ball valve, a gate valve, or a solenoid valve. The hearing assistance device may be a behind-the-ear (BTE) hearing aid or a receiver-in-the-canal (RIC) hearing aid, in some embodiments. In an embodiment, the method may also include using a ferromagnetic material configured to maintain a position of the switch without drawing power from a power supply of the hearing assistance device.

In various embodiments, the microphone is situated on the RIC Cable in the ear canal. In some embodiments, the microphone port faces into an acoustic channel. Inside the acoustic channel, there is a switch or vent to change the porting of the acoustic channel to direct the microphone to be such that the sound port is in the "in position" or the "out position". The switch or vent can be either mechanically or electromechanically actuated to change the acoustic signal input, in various embodiments. In various embodiments, the acoustic switch can be a sliding spool style valve, a butterfly style valve, a moveable membrane style valve, a ball style valve, a gate valve, and/or a solenoid style valve. In some embodiments, the acoustic switch can open to an additional position such that the acoustic porting is fully open from the volume inside the ear to the outside world while the microphone porting is still open to the overall acoustic path. In further embodiments, the acoustic switch can open such that the acoustic porting is fully open from the volume inside the ear to the outside world while the microphone porting is closed off to the overall acoustic path. According to various embodiments, the microphone and switch are incorporated to a "behind-the-ear" hearing aid, personal sound amplification product (PSAP), over the counter (OTC) hearing device, headphones, hearables, or the like. According to other embodiments, the microphone and switch are incorporated to a "in-the-ear" hearing aid, PSAP, OTC hearing device, headphones, hearables, or the like. In some embodiments, a physical or mechanical switch or vent can be used. In some embodiments, an electromechanical switch or vent can be used.

Benefits of the present subject matter include providing both an inward and outward facing acoustic port using only one microphone. The present subject matter eliminates a microphone from the system saving space, and reducing number of microphone signal lines. In addition, the present subject matter reduces cost of the device, and reduces power consumption thus extending battery life. Using the acoustic vent or switch can reduce the number of components in the receiver housing as well as reduce the number of wires and therefore signals that need to be carried by the cable. Thus, the present subject matter can provide a lower cost of components, fewer data signal inputs, and lengthens an acoustic path to the microphone potentially reducing a likelihood of foreign material ingress to the component.

Various embodiments of the present subject matter support wireless communications with a hearing assistance device. In various embodiments the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM. Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing assistance devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in devices whether such devices are standard or custom fit and whether they provide an open or an occlusive design. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing assistance device, comprising:

a first housing configured to be worn above an ear of a wearer, the first housing including hearing assistance electronics;

a second housing configured to be worn in the ear of the wearer, the second housing including a receiver configured to output signals processed by the hearing assistance electronics;

a cable configured to connect to the first housing at a first end and to the second housing at the second end;

a microphone at the second end of the cable, the microphone including an input port facing an acoustic channel; and a switch in the acoustic channel, the switch having a first position in which the acoustic channel is open towards an inner portion of the ear of the wearer such that acoustic input to the microphone is received from the inner portion of the ear of the wearer, and a second position in which the acoustic channel is open away from the inner portion of the ear of the wearer such that acoustic input to the microphone is received from an area outside the ear of the wearer.

2. The device of claim 1, wherein the microphone, the acoustic channel and the switch are included in the cable.

3. The device of claim 1, wherein the microphone, the acoustic channel and the switch are included in the second housing.

4. The device of claim 1, wherein at least one of the microphone, the acoustic port and the switch are included in the cable, and wherein at least one of the microphone, the acoustic port and the switch are included in the second housing.

5. The device of claim 1, wherein switch includes an acoustic switch.

6. The device of claim 5, wherein the acoustic switch includes one or more of a sliding spool valve, a butterfly valve, a movable membrane valve, a ball valve, a gate valve, or a solenoid valve.

7. The device of claim 1, wherein switch includes an acoustic vent.

8. The device of claim 1, wherein switch is configured to be mechanically actuated.

9. The device of claim 1, wherein switch is configured to be electromechanically actuated.

10. The device of claim 1, wherein the first housing includes a second microphone configured to receive an acoustic input for processing by the hearing assistance electronics.

11. The device of claim 1, wherein the switch includes a third position in which the acoustic channel is open towards an inner portion of the ear of the wearer and open away from the inner portion of the ear of the wearer such that acoustic porting is open from the inner portion of the ear of the wearer to the area outside the ear of the wearer, and wherein acoustic input to the microphone is open to the acoustic channel.

12. The device of claim 11, wherein the switch includes a fourth position in which the acoustic channel is open towards an inner portion of the ear of the wearer and open away from the inner portion of the ear of the wearer such that acoustic porting is open from the inner portion of the ear of the wearer to the area outside the ear of the wearer, and wherein acoustic input to the microphone is closed to the acoustic channel.

13. The device of claim 1, wherein the hearing assistance device is a receiver-in-the-canal (MC) hearing aid.

14. A method, comprising:

processing sound received through a first acoustic path of a microphone using a processor of a hearing assistance device, wherein the microphone is in a receiver housing configured to be placed in or near an ear of a wearer of the hearing assistance device;

actuating a switch in the receiver housing to shift from the first acoustic path to a second acoustic path of the microphone; and processing sound received through the second acoustic path using the processor of the hearing assistance device.

15. The method of claim 14, wherein the first acoustic path is open towards an inner portion of the ear of the wearer and closed away from the inner portion of the ear of the wearer such that acoustic input to the microphone is received from the inner portion of the ear of the wearer.

16. The method of claim 14, wherein the second acoustic path is open away from an inner portion of the ear of the wearer and closed towards the inner portion of the ear of the wearer such that acoustic input to the microphone is received from an area outside the ear of the wearer.

17. The method of claim 14, wherein the switch includes an acoustic switch.

18. The method of claim 17, wherein the acoustic switch includes one or more of a sliding spool valve, a butterfly valve, a movable membrane valve, a ball valve, a gate valve, or a solenoid valve.

19. The method of claim 14, wherein the hearing assistance device is a behind-the-ear (BTE) hearing aid or a receiver-in-the-canal (RIC) hearing aid.

20. The method of claim 14, further comprising:

using a ferromagnetic material configured to maintain a position of the switch without drawing power from a power supply of the hearing assistance device.

* * * * *